(No Model.) 2 Sheets—Sheet 1.
E. R. STILWELL.
FEED WATER HEATER AND PURIFIER.
No. 592,670. Patented Oct. 26, 1897.
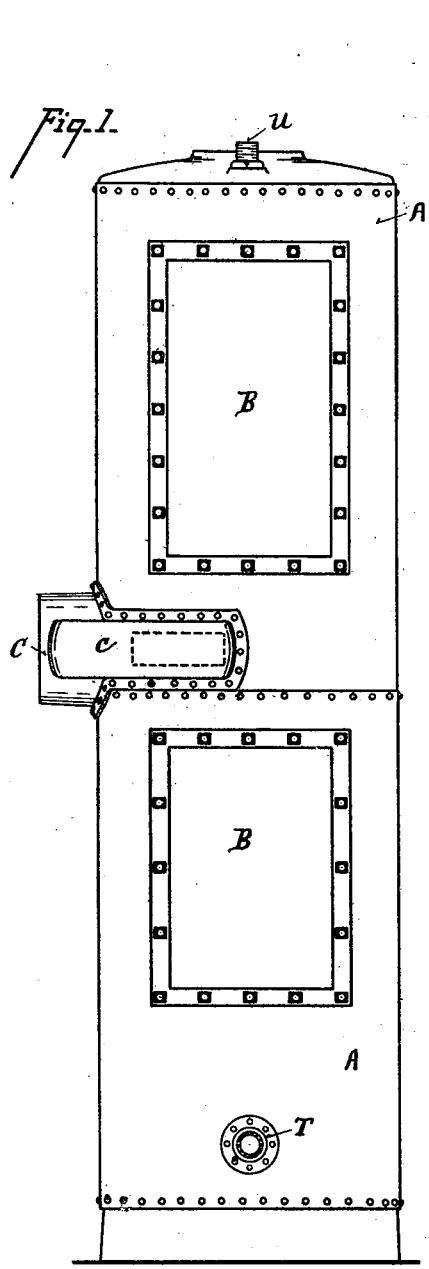
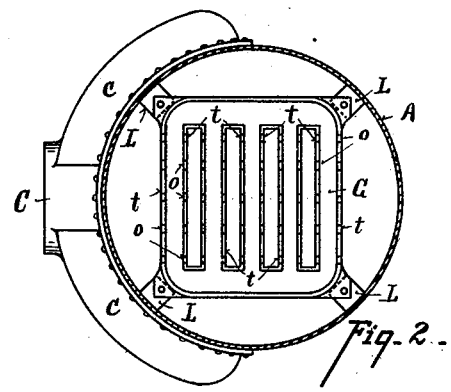
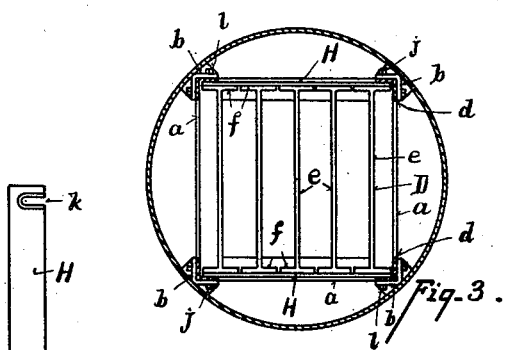
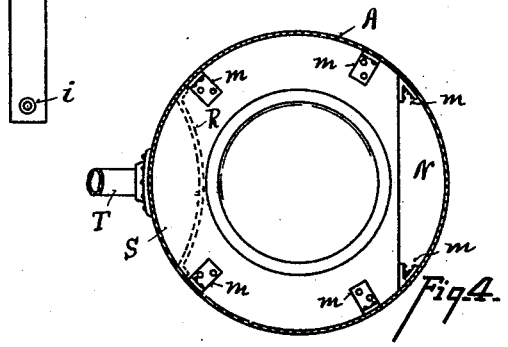
Witnesses
N. R. Wood
Oliver B. Kaiser
Inventor
Edwin R. Stilwell
by Wood & Boyd
Attorneys

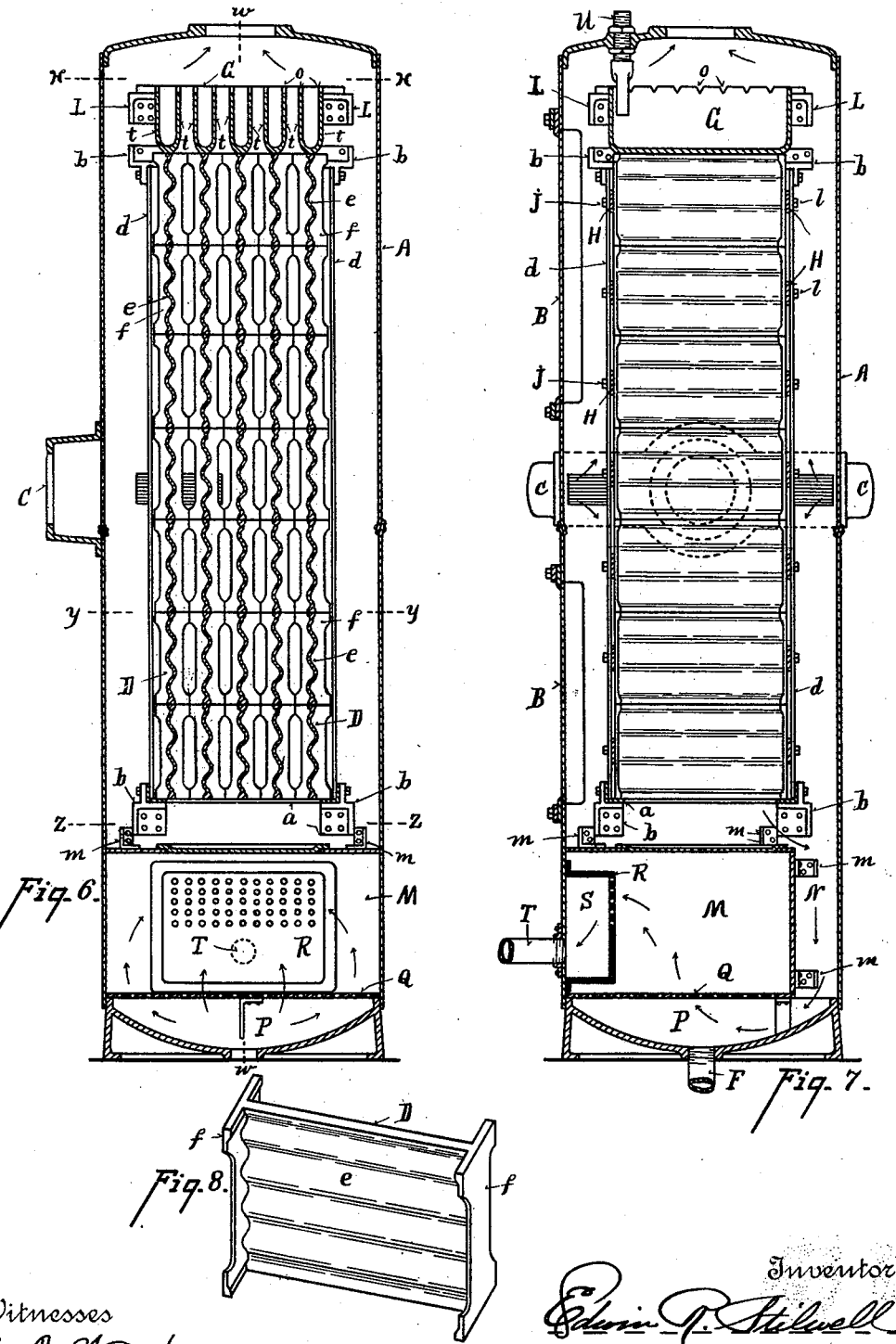

United States Patent Office.

EDWIN R. STILWELL, OF DAYTON, OHIO, ASSIGNOR TO THE STILWELL-BIERCE & SMITH-VAILE COMPANY, OF NEW JERSEY.

FEED-WATER HEATER AND PURIFIER.

SPECIFICATION forming part of Letters Patent No. 592,670, dated October 26, 1897.

Application filed April 23, 1897. Serial No. 633,479. (No model.)

*To all whom it may concern:*

Be it known that I, EDWIN R. STILWELL, residing at Dayton, in the county of Montgomery and State of Ohio, have invented certain new and useful Improvements in Feed-Water Heaters and Purifiers, of which the following is a specification.

The object of my invention is to form a series of vertical partitions or diaphragms formed in sections which when put together separate the heater vertically into compartments.

Another object of my invention is to make these partitions substantially vertical, but of wavy or irregular lines, and so disposed with relation to the overflow-boxes that the water trickles down said partitions in thin streams, so as to be quickly heated by the action of the steam coming in contact therewith.

Another object of my invention is to so construct the heater-partitions of sections which can be readily taken out for cleaning.

The features of my invention are more fully set forth in the description of the accompanying drawings, making a part of this specification, in which—

Figure 1 is a front elevation of the shell of a heater. Fig. 2 is a section on line $x$ $x$, Fig. 6. Fig. 3 is a section on line $y$ $y$, Fig. 6. Fig. 4 is a section on line $z$ $z$, Fig. 6. Fig. 5 is a plan view of the fastening-slat. Fig. 6 is a central vertical longitudinal section of Fig. 1. Fig. 7 is a section on line $w$ $w$, Fig. 6. Fig. 8 is a perspective view of one of the partition-sections.

A represents the shell of the heater; B B, manhole-covers.

C represents a steam-pipe connection which is provided with two branches $c$ $c$, extending partly around the heater, so as to furnish steam on all sides of the partitions.

$b$ represents angle-iron brackets securely riveted to the sides of the heater at four points at the top and bottom thereof.

$a$ represents an angle-iron shelf resting on the lower angle-iron brackets, which forms the base for supporting the partition.

$d$ represents angle-iron studs or side supports extending from the bottom to the top brackets $b$.

D represents a section of one of the vertical partitions. I have shown five of these vertical partitions, and each partition is shown as composed of seven of these sections resting one upon the other, forming a vertical tier. The partitions are formed of wavy or corrugated lines $e$.

$f$ $f$ represent end flanges for strengthening the partitions and forming the base for one section to rest upon another.

$d$ represents vertical slats at each of the four corners for supporting the same in position. In order to prevent these sections from moving laterally, they are secured at each end by a detachable hinged slat H. It is provided at one end with an opening $i$, which hinges on the bolt $j$. (See Fig. 3.) $k$ represents a slot at the opposite end of said slat, which detachably engages with the bolt $l$, Fig. 3. When the partitions are set serially in position and as each horizontal row is completed, the slat H is turned on its hinge and hooked on the bolt, thus securing these partitions vertically in exact positions.

G represents an overflow-box (shown in plan, Fig. 2) into which the feed-water is introduced. There is one overflow-section for each vertical partition. Each side of the box has a series of notches $o$, over which the water passes and trickles down the sides $t$ of the overflow-box and thence onto the waved partitions $e$. This method of supplying the water to the partitions keeps it spread out in thin sheets for it to be readily taken up and heated by the steam which comes in contact with it. The soluble impurities in the water adhere to these partitions and pure water is obtained. This overflow-box rests on brackets L, secured to the sides of the heater.

M represents the filter-box, which is suspended near the bottom of the heater by brackets $m$.

N represents a space on one side of the filter-box for carrying the water down to the bottom P.

Q represents a perforated bottom filter-plate on which the filtering material is supported.

R represents a strainer surrounding the hot-water well S.

T represents the offtake-pipe.

F represents a blow-off pipe at the base.

U represents the water-inlet pipe.

Several advantages are obtained by the use of vertical partitions, each partition being supplied on both sides by a thin stream of water from the overflow-box. A large amount of heating-surface is thus provided. The water is carried in thin sheets and maintained in this position long enough to be thoroughly heated and to effect a thorough separation of the mineral salts contained therein. Being made in sections and formed in tiers, they are readily removable from the heater for cleaning or replacing.

The forming of sectional partitions which are substantially vertical, but of wavy or irregular lines and sufficiently abrupt to check the too rapid descent of the water, produces several advantages. First, increased strength and solidity for a given thickness of material is obtained; second, they can be made of cast-iron without danger of warping in cooling; third, they can be easily cleaned of scale; fourth, they furnish increased heating-surface; fifth, the partitions being substantially vertical can be placed close together in the heater, and being made in sections the heater can be entirely filled with the partitions, if desired.

Having described my invention, I claim—

1. In a feed-water heater and purifier, the combination with a casing having a steam-inlet, of a series of vertical partitions having irregular faces arranged in said casing, each partition comprising a plurality of sectional plates provided with bases adapted to be supported one upon the other, a series of overflow-boxes, one for each partition, each box being arranged directly above its respective partition and operating to supply water to both sides of the latter, a water-inlet for supplying water to said boxes, and a water-outlet leading from the bottom of the casing, substantially as described.

2. In a feed-water heater and purifier, the combination with a casing having a steam-inlet, of a vertical partition formed of sections D arranged in said casing, the lower section resting on a support in the lower portion of the casing and the succeeding sections resting one upon the other, attaching devices for detachably connecting said sections in position, means for supplying water in sheets or films to the opposite sides of the partition, and a water-outlet arranged in the lower end of the casing, substantially as specified.

3. In a feed-water heater and purifier, the combination with a casing having a steam-inlet and water-outlet, of substantially vertical partitions formed of sections D each section being provided with end flanges $f$, and said sections resting one upon another, means for detachably connecting the sections in position, an overflow-box for supplying sheets or films of water to the opposite sides of the partition, and a water-inlet for supplying water to said box, substantially as described.

In testimony whereof I have hereunto set my hand.

EDWIN R. STILWELL.

Witnesses:
GEORGE B. MCCANN,
BENJ. F. MCCANN.